Sept. 29, 1959　　　A. H. GOREY　　　2,906,186
SHUTTER TIMING MECHANISM FOR PHOTOGRAPHIC CAMERAS
Filed Sept. 8, 1955　　　4 Sheets-Sheet 1
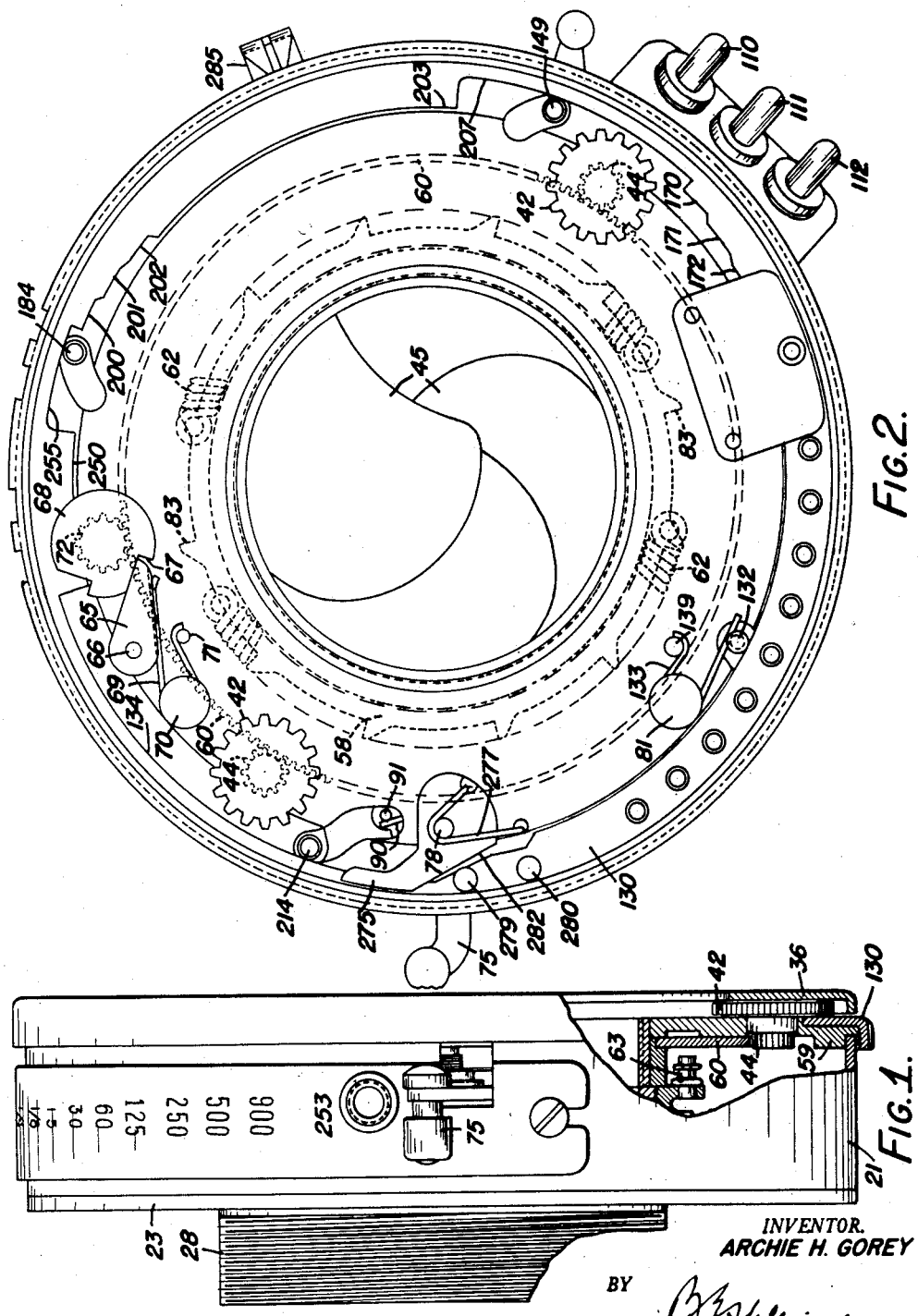
INVENTOR.
ARCHIE H. GOREY
BY
ATTORNEY Sept. 29, 1959 A. H. GOREY 2,906,186
SHUTTER TIMING MECHANISM FOR PHOTOGRAPHIC CAMERAS
Filed Sept. 8, 1955 4 Sheets-Sheet 2
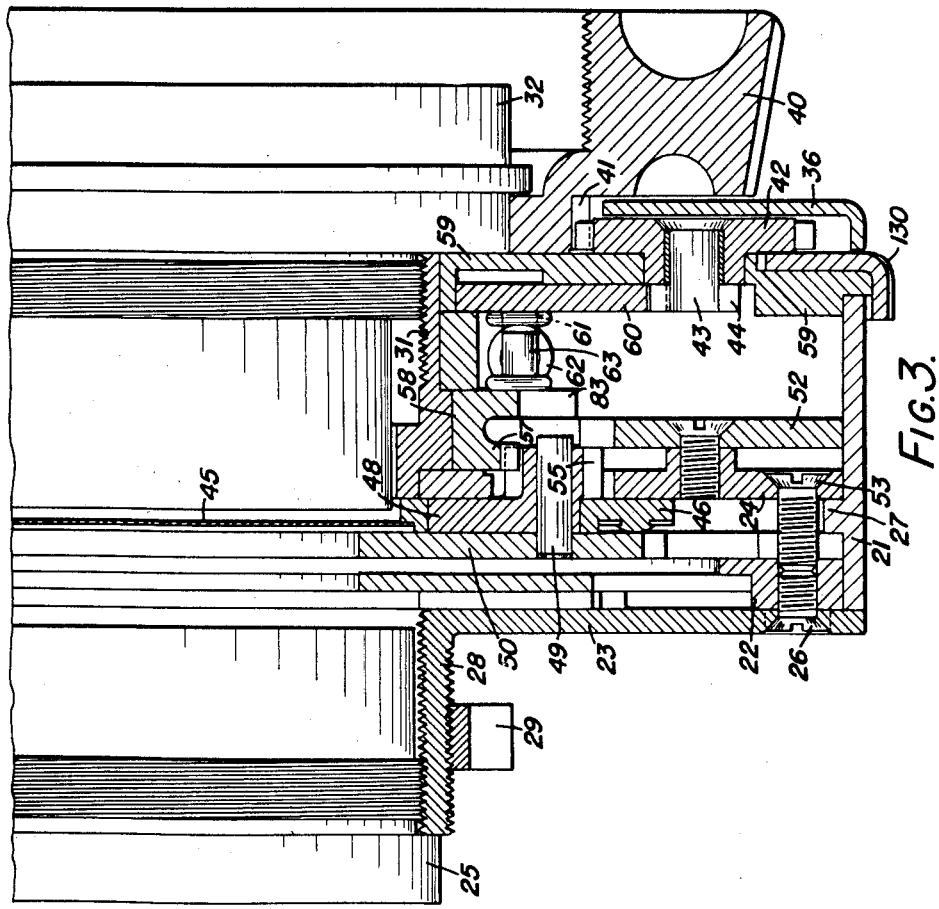
INVENTOR.
ARCHIE H. GOREY
BY
ATTORNEY Sept. 29, 1959     A. H. GOREY     2,906,186
SHUTTER TIMING MECHANISM FOR PHOTOGRAPHIC CAMERAS
Filed Sept. 8, 1955     4 Sheets-Sheet 3

INVENTOR.
ARCHIE H. GOREY
BY
ATTORNEY

Sept. 29, 1959 A. H. GOREY 2,906,186
SHUTTER TIMING MECHANISM FOR PHOTOGRAPHIC CAMERAS
Filed Sept. 8, 1955 4 Sheets-Sheet 4

INVENTOR.
ARCHIE H. GOREY
BY
ATTORNEY

United States Patent Office 2,906,186
Patented Sept. 29, 1959

2,906,186

SHUTTER TIMING MECHANISM FOR PHOTOGRAPHIC CAMERAS

Archie H. Gorey, Irondequoit, N.Y., assignor to Graflex, Inc., Rochester, N.Y., a corporation of Delaware Application September 8, 1955, Serial No. 533,124

8 Claims. (Cl. 95—63)

The present invention relates to shutter mechanism for photographic cameras, and more particularly to a timing mechanism for a between-the-lens type photographic shutter. In a still more specific aspect, the invention constitutes an improvement on the shutter timing mechanism disclosed in my pending U.S. patent application Serial No. 472,443, filed December 1, 1954.

It is desirable in any precision camera to have means for adjusting the speed of opening and closing the shutter so as to be able to suit the time that the shutter is open to the light conditions prevailing when a picture is being taken with the camera.

One object of the invention is to provide a shutter mechanism which can be adjusted for a wide variety of shutter speeds.

Another object of this invention is to provide a shutter having a speed adjusting and control mechanism which is capable of achieving a great variation in shutter speeds yet which is compact and will occupy a small amount of space.

Still another object of the invention is to provide an improved, adjustable retarding mechanism for adjusting and controlling the speeds of a camera shutter. To this end, it is a purpose of the invention to provide a speed adjusting and control mechanism for a camera incorporating a plurality of retarding trains and a cam for controlling the operation of such trains in such way that the retarding effect of each train may be adjusted to achieve a plurality of different shutter speeds, and that only one train may be in operation at a time or the retarding effect of a plurality of trains may be compounded, whereby wide control of shutter speeds is attainable.

A still further object of the invention is to provide a shutter mechanism of the character described in which the flash synchronization mechanism is adjusted simultaneously with adjustment of the shutter speed.

Other objects of the invention will be apparent hereinafter from the specification and from the recital of the appended claims.

In the drawings:

Fig. 1 is a partial side elevation partly broken away, of a between-the-lens shutter made according to one embodiment of the present invention;

Fig. 2 is a front elevation of this shutter with its front cover plate removed to show the interior of the shutter;

Fig. 3 is a fragmentary axial section on an enlarged scale through this shutter;

Figure 4:
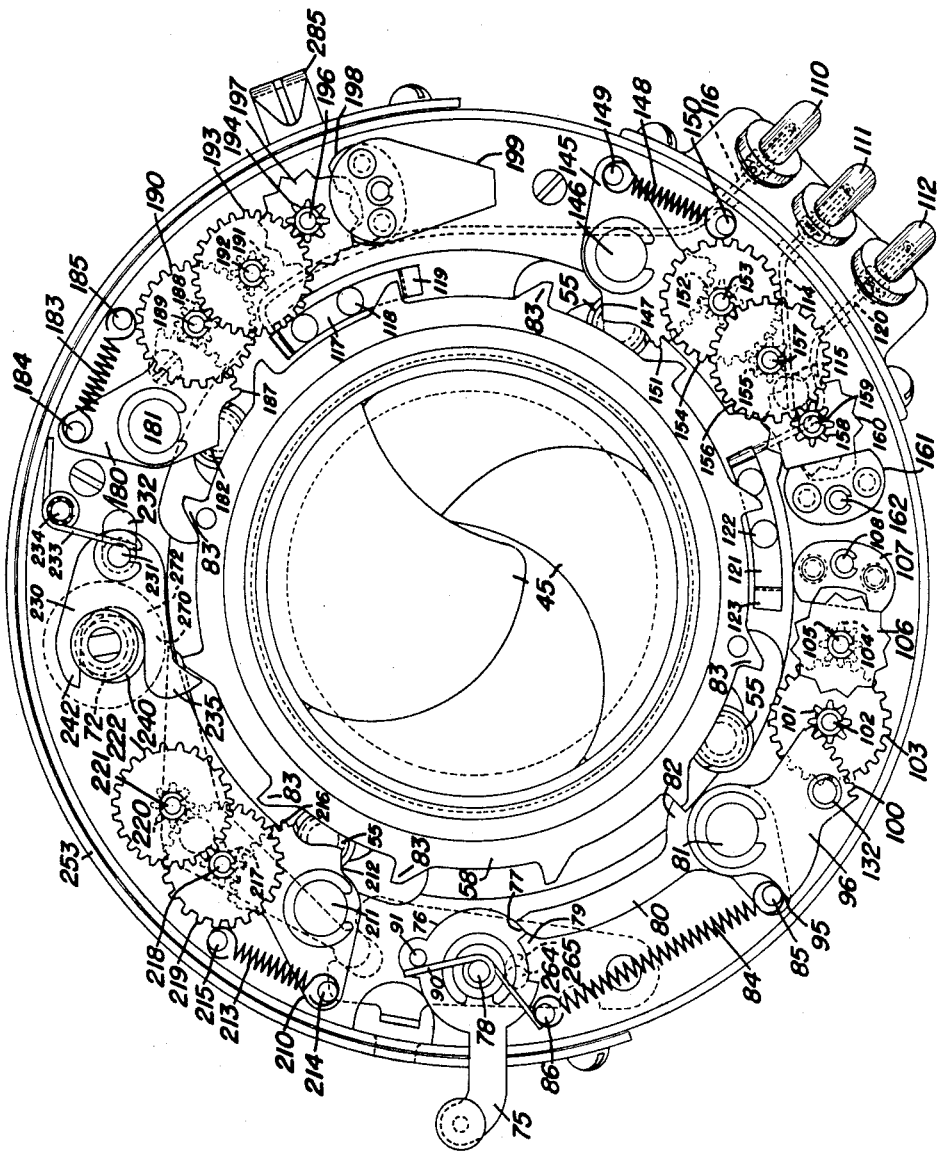
Fig. 4 is a transverse, sectional view of the shutter in a plane parallel to the plane of Fig. 2, and showing the flash synchronizing and shutter-timing trains of the shutter.

Referring now to the drawings by numerals of reference, 21 (Figs. 1 and 3) denotes the cylindrical body or housing for the shutter mechanism and for the lens elements. The back lens element 25 is threaded into the sleeve portion 28 of a supporting member 23 that seats against the rear end face of the housing 21, and that is secured to a ring 22 by screws 26. Ring 22 is secured in the casing by screws 53 which connect the ring with a mechanism plate 24 that abuts against the front face of the annular rib 27 which is integral with the casing and projects internally therein. The support for the back lens element 25 is threaded externally to thread into the lens board (not shown) of the camera. A nut 29 serves to secure it and the shutter in place.

The casing for the front lens element 32 of the mounting is threaded in a sleeve 31. Secured to the casing by screws (not shown) is a front cover plate 36 (Fig. 1).

Rotatably mounted on the casing 32 for the front lens element is a winding knob 40. This knob has a knurled peripheral surface so that it can readily be gripped and rotated; and it has an external gear 41 integral with it.

The shutter of the present invention may be provided, as is the shutter of my prior application above mentioned, with four shutter leaves 45 (Figs. 2 and 4). These are designed so that they overlap when in closed position to prevent passage of light from the forward lens element to the rear lens element and to the sensitive medium which is to be exposed in the camera. Each shutter leaf is secured to a hub 46 (Fig. 3). Each hub fits rotatably on an eccentric member 48 that is journaled on a stud 49 which, in turn, has a pressed fit in a shutter leaf plate 50. The leaf plate 50 is rotatably movable in the casing 21, but is held against axial movement relative to the casing 21 by annular rib 27 and ring 22.

Formed integral with each eccentric 48 is a spur pinion 55. The several pinions 55 mesh with a master spur gear 57 that is journaled on the sleeve 31, and that is integral with a sprocket 58.

The shutter is cocked by rotating winding knob 40. This causes the external gear 41 (Fig. 3) to drive a pair of spur pinions 42 which mesh with the gear and which are spaced 180° apart (Fig. 2) about the axis of the gear. These pinions are journaled in a plate 59. The spur pinions 42 rotate on two diametrically opposite studs 43; and each is integral with a spur pinion 44. The spur pinions 44 mesh with an external spur gear 60 (Fig. 3). Spur gear 60 has two diametrically opposite studs 61 secured in it. Secured to each stud is one end of a coil spring 62 (Figs. 2 and 3). Each of these coil springs is secured at its opposite end, as is disclosed more fully in the patent above mentioned, to a stud 63. The two studs 63 are diametrically opposite and are riveted in the sprocket portion 58 of the master gear 57.

The shutter mechanism of the present invention is designed to be actuated by the springs 62, which are tensioned upon the described manual rotation of the winding knob 40. When the shutter mechanism is tripped by trigger 75 (Fig. 2), the springs 62 drive the master gear 57 and the pinions 55, causing the shutter leaves to be successively opened and closed, the mechanism operating in this particular, as described in the patent application above mentioned. The amount of the winding movement of the gear 60 is limited by stud 61 catching up with stud 63; and the wound gear 60 is prevented from reversing by a stop dog 65 (Fig. 2), such as shown in the application above mentioned. This dog is pivotally mounted on a stud 66 in the plate 59. It is adapted to engage against the shoulder 67 of a cam 68. The dog is held in engagement with the cam by a spring 69, which is coiled about the pin 70 and which has one end engaged against the pin 71 and its opposite end against the back of the dog 65. Pins 70 and 71 are secured in the mechanism plate.

The cam 68 is secured to a shaft that is journaled in the mechanism plate. It has a pinion 72 integral with it which meshes with the gear 60. Hence as gear 60 is rotated to wind the shutter mechanism, the cam 68 is rotated also. When the shutter mechanism has been wound, the cam 68 will have rotated far enough for the dog 65 to drop behind the shoulder 67 and the dog will thereby prevent reversing of gear 60.

The master gear 57 is prevented from rotating with the gear 60 during the winding operation, and after the shutter is cocked, and until the trigger 75 (Figs. 1 and 2) is tripped, by a lever 80 (Fig. 4) which is pivotally mounted upon a shaft 81 in the casing, and which has a shoulder portion 82 adapted to engage successively with teeth 83 of the toothed ring portion 58 of the master gear 57.

The lever 80 is constantly urged toward locking position by a coil spring 84, one end of which is secured to a pin 85 that is fastened in the tail of the lever, and the other end of which is secured to a pin 86 that is fastened in the mechanism plate.

The lever 80 is held in locking position by the trigger 75. The trigger 75 has an arcuate peripheral surface 76 with which the end surface 77 of the lever 80 engages when the lever is in locking position. The surface 80 is concentric with the axis of the stud 78 on which the trigger rocks. The trigger has a recess 79 in its peripheral surface into which the free end of the lever 80 drops when the trigger is moved counter-clockwise from the position shown in Fig. 4. The coil spring 84 is not as strong as the coil springs 62 (Figs. 2 and 3) of the windup mechanism; and so, when the trigger is tripped, the tension of the coil springs 62 will cause the tooth 83, that is in engagement with the shoulder 82 of lever 80 to kick the lever out of the way to permit the sprocket 58 and the master gear 57 to revolve.

When the trigger is released it is swung back to the position of Fig. 4 by operation of the coil spring 90, which is wrapped around the pivot pin 78 of the lever and which engages at one end against a pin 91 carried by the trigger, and at its opposite end against the pin 86.

For flashlight pictures it is desirable to time the flash so that its peak synchronizes with the full opening of the shutter. Since the time of full opening of the shutter varies with different speed settings of the shutter mechanisms, it is desirable, then, that the time of tripping of the flash bulb vary with the speed setting to get optimum flash effect at all the different shutter speeds. This result is achieved with the mechanism of the present invention.

In a camera of the present invention, there are three electrical terminals or contact posts for the plugs that connect with the flash lamps. One post 110 (Figs. 2 and 4) and the center post 111 are used when a so-called "M" type flash lamp is employed. Such a lamp has a long peak of illumination. The other terminal 112 and the center post 111 are used when "F" or "X" lamps are used. Center post 111 is connected by a conductor 114 with a ground post or terminal 115 in the lens mounting. Post 110 is connected by a conductor 116 with an L-shaped conductor 117 that is insulated from the lens casing, and that is riveted thereto by rivets 118 made of nylon or other suitable insulating material. The conductor strap 117 has a free end 119 bent upwardly for engagement with and contact by the teeth 83 of the sprocket 58; so that when the sprocket engages the bent-up portion 119 of the conductor strap 117 a circuit is made to the flashlamp, that is plugged to terminals 110 and 111, through the lens casing from post 110 through conductor 116, strap 118, a tooth 83 of the sprocket, which is grounded to the casing, the ground terminal 115, the conductor 114 and post 111 to ignite the flash lamp.

When an "F" or "X" lamp is used, it is plugged to the posts 111 and 112. Post 112 is connected by a conductor 120 with a conductor strap 121 which is insulated from the casing and which is riveted thereto by rivets 122 made of nylon or other suitable insulating material. The strap 121 has a bent-up portion 123 which is adapted to be engaged by a tooth 83 of the sprocket 58 to close the circuit from post 112 through conductor 120, strap 121, a tooth 83 of the sprocket 58, which is grounded to the casing, ground post 115, conductor 114 and post 111 to the flash lamp.

It will be noted that in the locked-up position of the sprocket the bent-up contact portion 123 of the strap 121 is positioned considerably further angularly away from a tooth 83 of the sprocket 58 than is the contact portion 119 of the strap 117. The contact portion 123 is positioned to make contact when the shutter is fully opened; while the contact portion 119 is positioned to make contact as soon as possible after the shutter is tripped. This is because the type "F" and "X" flash lamps have a very much shorter delay before peak illumination than do the "M" type flash lamps. In fact, "F" type lamps reach peak illumination instantaneously. Therefore, the "F" and "X" type lamps do not require an adjustable timing of their contact 119 to be within the usable peak illumination regardless of the shutter speed setting.

The amount of delay that occurs before firing of the "M" type flashlamps is controlled by the speed of movement of the sprocket 58 itself once the trigger is tripped to release the sprocket.

When the lever 80 is rocked out of engagement with a tooth 83 of the ratchet wheel 58, the pin 85 carried by the tail of the lever is rocked against the ledge 95 (Fig. 4) of the arm 96.

The arm 96 is formed with a gear segment 100 which meshes with a pinion 101 that rotates on a stud 102 which is fixed in the mechanism plate. The pinion 101 is integral with a spur gear 103 that in turn meshes with a pinion 104 which is rotatable upon a stud 105 also fixed in the mechanism plate. Integral with the pinion 104 is a star wheel 106 of conventional construction. This star wheel engages an escapement or pallet 107 that is pivotally mounted on stud 108. The gears 100, 101, 103, 104, star wheel 106, and pallet 107 act as a delay for the movement of the lever 82 and determine the time of operation of the flash with reference to the opening of the shutter.

As previously stated, it is desirable that the shutter operating mechanism be adjustable so that the shutter may be opened for longer or shorter periods depending upon the subject and the picture-taking conditions. To vary the speed of opening and closing of the shutter the speed setting ring 130 is provided. This ring is rotatably mounted between the mechanism plate and the lens cover 36 as shown in Fig. 3. The ring 130 has a knurled peripheral surface and is adapted to be rotated manually to adjust the shutter speed.

To adjust the flash synchronization, the time between the tripping of the locking portion 82 of the lever 80 out of engagement with the sprocket wheel and the engagement of the pin 85 of this lever with the arm 96 is adjusted. This adjustment is effected by rotatable adjustment of a timing ring 130, and is effected simultaneously with adjustment of the shutter speed as will be described hereinafter. The arm 96 carries a pin 132 (Figs. 4 and 2) which is constantly urged into engagement with the timing cam by a coil spring 133. Spring 133 is wrapped around pin 85, engages at one end with pin 132 and at its opposite end with a pin 139 that is secured in the mechanism plate. For fastest shutter speeds, the pin 132 is positioned to be clear of the timing ring 130. For slower shutter speeds, the timing ring will be shifted angularly so that the pin rides up the inclined portion 135 (Fig. 5) of the timing ring onto the portion 136 of the ring. For still slower shutter speeds, the timing ring is further shifted so that the pin rides up the portion 137 of the timing ring onto the portion 138 of the ring.

In the shutter of the present invention, there are three separate timing trains, which singly or in combination determine the speed of operation of the shutter. One of these trains comprises an arm or dog 145 (Fig. 4) which is pivotally mounted upon a stud 146 that is secured in the mechanism plate. This arm or dog has a ledge 147 that is adapted to be engaged by a tooth 83 of the sprocket 58 as the sprocket rotates under actuation of the springs 62. The arm 145 is constantly urged into position to be engaged by a tooth of the sprocket by a coil spring 148 which is secured at one end to a pin 149 that is fastened in the tail of the dog. The opposite end of this spring is secured to a pin 150 which is fastened in the mechanism plate. The arm or dog 145 is provided with segmental gear teeth 151 which mesh with the teeth of a pinion 152 which is journaled on a stud 153 that is secured in the mechanism plate. Integral with the pinion 152 is a spur gear 154 which meshes with a spur pinion 155. The pinion 155 is integral with a gear 156 and both are mounted upon a stud 157 which is secured in the mechanism plate. Gear 156 meshes with a pinion 158 which is mounted upon a stud 159 that is mounted in the mechanism plate. Integral with the pinion 158 is a star wheel 160 which engages with a pallet or escapement 161 that is journaled on a stud 162 which is secured in the mechanism plate.

Figure 5:
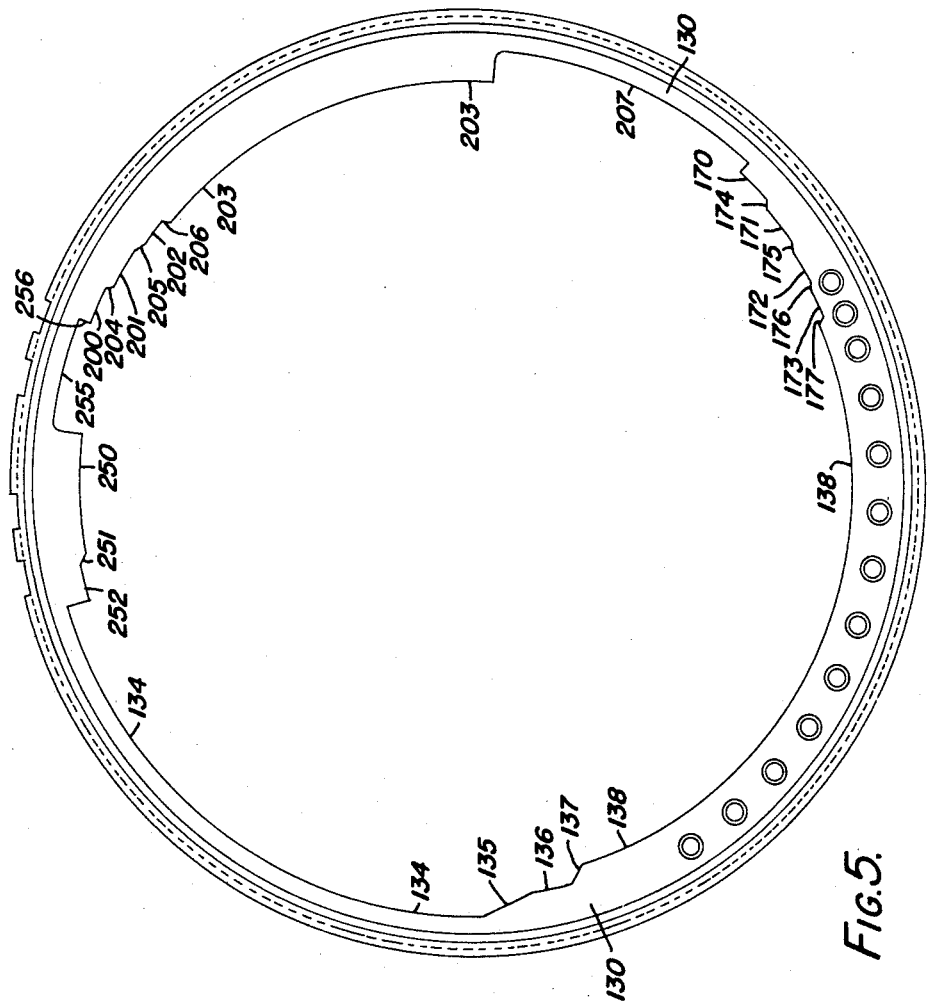
Fig. 5 is a front elevation of the timing cam of the shutter.

The ledge 147 of the dog 145 is normally held by spring 148 in position to be engaged by one of the teeth 83 of the sprocket 58 as the sprocket rotates under actuation of the springs 62 (Fig. 2) after the trigger has been tripped. As the drive gear runs down, the dog 145 is engaged, the instant of engagement depending upon the setting of the timing ring 130, as will be described further hereinafter. As the dog 145 swings in an arc it rotates the train of gearing 151, 152, 154, 155, 156, and 158 to cause the teeth of the star wheel 160 to rock the pallet or escapement 161 about the stud 162. The pallet or escapement operates as in a conventional timing train to apply a braking action to the sprocket 58 thereby retarding the closing of the shutter leaves. The degree of retardation is varied in accordance with the setting of the timing ring 130 (Fig. 5).

The pin 149 of the dog 145 may be engaged with any one of the surfaces 170, 171, 172, 173, and 138 (Fig. 5) of the timing ring 130. These surfaces are at different radial distances from the axis of the ring and of the lens mounting. Surface 170 is connected with surface 171 by a rise 174. Surface 171 is connected with surface 172 by a rise 175. Surface 172 is connected with surface 173 by a rise 176; and surface 173 is connected with surface 138 by a rise 177.

The second retarding train comprises a dog or arm 180 (Fig. 4) which is pivotally mounted upon a stud 181 that is secured in the mechanism plate. This dog has a ledge portion 182 which is adapted to be engaged by a tooth 83 of the sprocket 58. It is constantly urged toward a position, where it will be engaged by a tooth of the sprocket, by a coil spring 183 which is secured at one end to a pin 184 on the dog and at its opposite end to a pin 185 that is fastened in the mechanism plate. The dog 183 is provided with segmental gear teeth 187 that mesh with the teeth of a pinion 188 which is journaled on a stud 189 that is secured in the mechanism plate. Integral with the pinion 188 is a gear 190 that meshes with a pinion 191 which is journaled on a stud 192 which is secured in the mechanism plate. Integral with the pinion 191 is a gear 193 which meshes with a pinion 194 that is rotatably mounted upon a stud 196 which is secured in the mechanism plate. Integral with the pinion 194 is a star wheel 197 that engages an escapement or pallet 198. This escapement or pallet is formed with a long tail 199 further to slow down its movement. As the sprocket 58 runs down, if the ledge 182 is in the position to be engaged by a tooth of the sprocket, the dog 180 is rocked to oscillate the pallet 198 through the train of gearing 187, 188, 190, 191, 193, 194, and the star wheel 197. As with the other retarding trains, the pallet operates to apply a braking action, thereby retarding the closing of the shutter leaves. The degree of retardation depends upon the setting of the ring 130 (Fig. 5).

The pin 184 is adapted to engage one or other of the surfaces 255, 200, 201, 202 and 203 of the setting ring 130, to adjust the position of the dog 180, to determine whether that dog is engaged by a sprocket tooth 83, and, if so, at what point in the rotation of the sprocket wheel. The successive surfaces 255, 200, 201, 202 and 203 are connected to one another by rises 256, 204, 205, and 206. The timing ring is recessed between the surface 170 and the surface 203 as denoted at 207.

The third retarding train of the shutter comprises a dog 210 (Fig. 4) which is rockably mounted upon a stud 211 that is secured in the mechanism plate. This dog has a ledge 212 which can engage with a tooth 83 of the sprocket 58. It is constantly urged toward engaging position by a coil spring 213 which is connected at one end to a pin 214 that is secured in the tail of the dog 210. Spring 213 engages at its other end with a pin 215 which is secured in the mechanism plate. The dog 212 is provided with segmental spur gear teeth 216 which mesh with the teeth of the pinion 217 that is rotatably mounted upon a stud 218 which is secured in the mechanism plate. Integral with the pinion 217 is a gear 219. This gear meshes with a pinion 220 which is journaled on a stud 221 that is secured in the mechanism plate. Integral with the pinion 220 is a gear 222. The retarding train comprises the dog 210, gear segment 216, pinion 217, gear 219, pinion 220, and gear 222. It has no escapement or pallet. It depends wholly on the inertia between the members of the train to effect retardation.

The pin 214 is adapted to be engaged selectively with the steps or lands 250, 252, and 134 (Fig. 5) of the cam ring 130 to adjust the position of stop ledge 212 of the dog 210. Lands 250 and 252 are connected by a rise 251.

A brake member 230 (Fig. 4) is positioned to engage a tooth 83 of the sprocket, regardless of the speed setting of the shutter, to slow down the sprocket as the sprocket approaches its run-down position. This brake comprises a U-shaped member 230 to which there is secured a pin 231. The pin is slidable in a slot 232 in the mechanism plate. It is constantly urged to one end of that slot by a coil spring 233 which engages at one end with the pin, which is wrapped around a pin 234, and which engages at its opposite end with the inside of the lense casing. The pin 234 is secured in the mechanism plate.

The brake member 230 has a portion 235 positioned to engage a tooth of the sprocket wheel 58. Just as the shutter leaves close, at the end of a picture-taking operation, that is, just before the sprocket reaches its terminal position under actuation of the springs, one of the teeth 83 of the sprocket strikes the arm 235 of the brake member 230, forcing the braking member to move rectilinearly, by reason of the engagement of the pin 231 in the slot 232, against resistance of the spring 233. Thus, the force of movement of the sprocket 58 and master gear 57 is dampened in the last portion of their movement by shoving the brake member against the spring 233. The brake member stops the master gear just short of the position where a tooth 83 of the sprocket 58 engages again with the portion 82 of the lever 80. This allows the lever to get into proper position to hold the sprocket and the master gear against movement when the shutter mechanism is rewound.

When the shutter is rewound, the brake member 230 is moved out of the path of the teeth of the sprocket 58 automatically by means of a cam or eccentric 240. This cam is integral with the pinion 72 (Fig. 2), which has meshing engagement with the gear 60. Its eccentric portion engages the forked-portion 242 of brake member 230 to move the brake member out of position where it would engage a tooth of sprocket 58. This disengagement of the brake member from the sprocket permits the sprocket to move the slight distance required for a tooth of the sprocket to engage the ledge portion 82 of the arm 80 again so that windup operation of the springs 62 can take place.

For the highest speed operation of the shutter, say one nine-hundredth of a second, the timing ring 130 (Fig. 5) is adjusted angularly about the axis of the shutter, so that the index mark on the ring is opposite graduation "900" on plate 253 (Fig. 1) that is secured to casing 21. In this position, the pin 214 of dog 210 is riding on the portion 250 of the timing ring, the pin 184 carried by dog 180 is riding on the portion 203 of the timing ring, the pin 149 carried by the dog 145 is riding on the portion 138 of the timing cam, and the pin 132 of lever 96 is free of the timing cam. The dogs 210, 180, and 145 are therefore cammed away from the sprocket 57 so that they cannot engage the teeth 83 of the sprocket to retard the movement of the sprocket. Hence, in this position there will be nothing to retard the movement of the sprocket so that opening and closing of the shutter will take place at maximum speed. Moreover, since pin 85 is in contact with ledge 95 lever 80 will exert a force on lever 96 so that maximum motion will be imparted to the synchronizing train 100, 101, 103, 104, 106, 107, and there will be maximum retardation of the sprocket before the shutter leaves start to open. Hence, if a flashlamp is used, the flash will occur at the required delay time for that speed. The flashlamp is fired, of course, as soon as a tooth 83 of the sprocket strikes portion 119 of conductor strap 117 or portion 123 of conductor strap 121, depending upon whether the flashlamp is connected to posts 110 and 111 or to posts 111 and 112. Brake member 230 will stop the sprocket at the end of the cycle.

For the next fastest speed, say one five-hundredth of a second, the timing ring 130 is adjusted clockwise in Fig. 5 to bring the index mark on the ring opposite the graduation "500" on plate 253 (Fig. 1). In this adjustment, the pin 214 rides down the slope 251 of the timing ring onto the portion 252 of the ring. Pin 132 of lever 96 will, however, still be clear of the ring, and pins 184 and 149 will still be on the lands 203 and 138, respectively, of the timing ring. The land 252, however, will permit the spring 213 to swing the dog 210 into position where it will engage a tooth of the sprocket wheel. Thereby, the closing of the shutter is retarded. Since pin 132 is still clear of the ring there is the same delay as for the "900" setting but well within the usable flash portion of the lamp.

When the timing ring is adjusted to the next position "250" (Fig. 1) the pin 214 of dog 210 (Fig. 4) drops onto the portion 134 (Fig. 5) of the timing ring, and the next slower shutter speed, say one two hundred fiftieth of a second, can be achieved. In this position pin 184 of dog 180 is still riding on portion 203 of the timing cam, pin 149 of dog 145 is still riding on portion 138 of the timing cam; and pin 132 will still be clear of the cam. With pin 214 riding on portion 134 of the timing ring, dog 210 will be swung to a position to engage a sprocket tooth earlier in the cycle than when pin 214 is riding on portion 252 of the timing cam. Therefore the timing train 216, 217, 219, 220, 222 will become effective earlier in the cycle; and the desired greater retardation of opening and closing of the shutter blades is achieved.

For the next slowest speed of the shutter, say one one-hundred twenty-fifth of a second, the timing ring is adjusted further clockwise to setting "125." The pin 214 will continue to ride on the portion 134 of the timing ring, and the pin 184 will continue to ride on the land 203 of the timing ring, but the pin 149 will drop down onto the step 173 of the timing ring and the step 136 of the timing ring will now engage pin 132 of lever 96. The land 173 (Fig. 5) will allow spring 148 (Fig. 4) to swing dog 145 into position where it will engage a tooth 83 of the sprocket during a cycle of operation of the shutter. The sprocket movement, and therefore, the shutter cycle will now be retarded not only by dog 210 but by dog 145. Thus, a longer opening cycle of the shutter will be achieved. The land 136 moves the ledge 95 of lever 96 away from pin 85. Therefore pin 85 will have further to travel on tripping of the lock lever 80, than when pin 132 was riding free of the timing ring. Thus, pin 85 will operate lever 96 over a shorter distance to excite and oscillate the synchronizing train sufficiently to delay initial movement of the sprocket. Thus the desired shorter delay period will be attained.

For the next slowest speed, say one sixtieth of a second, the timing ring is further adjusted clockwise. Pin 184 will continue to ride on the land 203 of the timing ring and the pin 214 will continue to ride on the land 134 of the ring, but the pin 149 will ride down onto the land 172 of the cam ring, and the pin 132 will ride up onto the step 138 of the cam ring. Thus, spring 148 will swing the dog into a position to engage a tooth of the sprocket still earlier in the cycle and have its train 151, 152, 154, 155, 156, 158, 160, 161 begin its retarding effect earlier in the cycle; and the synchronizing train will also produce a still shorter delay in tripping the flash.

For the next slowest speed, say one thirtieth of a second, the timing ring is adjusted so that the pin 149 will ride on the land 171, swinging the dog 145 into position to engage a tooth of the sprocket wheel, to become effective still earlier in the cycle. The pin 132 will continue to ride on the land 138 of the ring; and the pins 184 and 214 will continue to ride on lands 203 and 134, respectively.

For one fifteenth of a second, the timing ring is adjusted so that the pin 149 rides on the land 170; so that dog 145 becomes effective still earlier in the cycle.

For the next slowest speed, say, one-eighth of a second the pin 149 rides on the land 207 of the setting ring while the pin 184 drops down onto the land 202 of the timing ring. The pins 132 and 214 continue to ride on the lands 138 and 134, respectively. The dog 180, therefore, now becomes effective in retarding the sprocket wheel, cooperating with the dogs 145 and 214 which are already effective at maximum efficiency in retarding the shutter cycle.

For one fourth of a second shutter speed, the pin 184 will ride on the land 201, while the pins 132, 214 and 149 continue to ride on the lands 138, 134, and 207, respectively. For one half second shutter speed the pin 184 will be riding on the land 200; and the other pins will be riding on the lands 134, 138, 207, respectively. For one second shutter speed, the pin 184 will be riding on the land 255; and the other pins will be riding on the lands 134, 138 and 207, respectively. The dog 180 will be moved, therefore, in the successive settings from one-eighth second to one-fourth second to one-half second to one second to successive positions where it becomes successively effective earlier in the shutter cycle, therefore, allowing timing train 187, 188, 190, 191, 193, 194, 197, 198 to exert its retarding effect earlier in the cycle. For all the shutter stop positions from one-eighth second to one second, dog 180 works in combination with dogs 210 and 145 to retard the sprocket movement and the shutter cycle.

For so-called "bulb" operation, a pin 279 (Fig. 2) is provided on the timing ring 130 and a pivoted lever 275 is provided on the mechanism plate. The lever 275 is pivoted on the pin 78 on which trigger 75 pivots, and is constantly urged out of operative position by coil spring 277. When the timing ring is adjusted to a position where pin 279 engages the back 282 of lever 275, lever 275 will be swung clockwise about its pivot 78 to a position where it will be engaged by pin 91 on trigger 75 (Fig. 4) and will be held thereby in a position to prevent pin 214 of dog 210 (Fig. 4) from completing its oscillating movement. This will prevent sprocket 58 from completing its cycle and will hold the sprocket drive gear 60 (Fig. 2) in position where the shutter leaves are open.

The shutter leaves are held in this position until the trigger 75 is released, which will permit the lever 275 to be swung by pin 214 inwardly out of the way, to allow the dog 210 to complete its oscillatory stroke and return to its original position.

For a time exposure, a pin 280 (Fig. 2) is provided on the timing ring 130. When the timing ring is adjusted to the next clockwise position, pin 280 engages the lower part of the back surface 282 of lever 275, preventing the lever 275 from moving inward when trip lever 75 is released. The shutter is thereby held open as long as desired. To close the shutter, the timing ring must be moved back far enough counterclockwise for pin 280 to clear the surface 282.

Shims in the form of sleeves may be provided to be fitted about the pins 149, 184, and 214, to time precisely the positions of these pins. These shims can be made of various thicknesses in order to properly position the pins.

The diaphragm opening may be set by a setting lever 285. The setting of the diaphragm and so-called "press-focusing" may be effected in the same manner as described in my patent above mentioned.

While the invention has been described in connection with a particular embodiment thereof, it is capable of further modification, and this application is intended to cover any variations, uses, or modifications of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. A shutter for photographic cameras comprising a casing, a shutter leaf movably mounted in said casing, a movable, spring-actuated master member for opening and closing the shutter leaf, a movable detent for holding the master member in cocked position, and shutter-speed timing mechanism comprising a plurality of pivoted levers, a separate retarding train of gearing operatively connected wtih each lever, and a single control member operatively connectable with all said levers and adjustable to position all or only a part of said levers simultaneously in position to be actuated by said master member as said master member moves.

2. A shutter for photographic cameras comprising a casing, a shutter leaf movably mounted in said casing, a rotatable master member for opening and closing the shutter leaf, and shutter speed timing mechanism actuatable by said master member as it rotates comprising a plurality of movable members, a separate retarding train connected with each movable member to be actuated thereby upon movement of the associated movable member, and a single control member for adjusting simultaneously one or more of the several movable members into and out of operative relation with said master member and for determining when a movable member that is adjusted into operative position, will be actuated by said master member as said master member rotates.

3. A shutter for photographic cameras comprising a casing, a plurality of shutter leaves movably mounted in said casing, a rotatable master member for opening and closing the shutter leaves, said master member having equi-angularly spaced teeth formed thereon, and shutter speed timing mechanism comprising a cam rotatably adjustable in said casing about the axis of said master member, a plurality of levers pivotally mounted in said casing in angularly spaced relation about the axis of said master member and operatively connectable to said cam to be adjusted about their respective pivots on adjustment of said cam so as to be moved selectively into and out of position for engagement by teeth of said master member as said master member rotates, and a separate retarding train operatively connected to each lever to be actuated upon rocking movement of the lever under actuation of a tooth of the master member.

4. A shutter for photographic cameras comprising a casing, a plurality of shutter leaves movably mounted in said casing, a rotatable master member for opening and closing the shutter leaves, said master member having angularly spaced teeth formed thereon, and shutter speed timing mechanism comprising a cam rotatably adjustable in said casing about the axis of said master member, a plurality of levers pivotally mounted in said casing in angularly spaced relation about the axis of said master member, and operatively connectable to said cam to be adjusted about their pivots on adjustment of said cam so as to be moved into and out of position for engagement by the teeth of said master member, and a separate retarding train operatively connected to each lever to be actuated upon rocking movement of the lever under actuation of a tooth of the rotating master member, said cam being so shaped that in one position of its rotary adjustment only one lever is moved into position to be engaged by a tooth of said master member as said master member rotates and so that in another position of its rotary adjustment a plurality of said levers are positioned to be engaged by different teeth of said master member as said master member rotates.

5. A shutter for photographic cameras comprising a casing, a plurality of shutter leaves movably mounted in said casing, a rotatable master member for opening and closing the shutter leaves, said master member having angularly spaced teeth formed thereon, and shutter speed timing mechanism comprising a cam rotatably adjustable in said casing about the axis of said master member, a plurality of levers pivotally mounted in said casing in angularly spaced relation about the axis of said master member, and operatively connectable to said cam to be adjusted about their pivots on adjustment of said cam so as to be moved into and out of position for engagement by the teeth of said master member, and a separate retarding train operatively connected to each lever to be actuated upon rocking movement of the lever under actuation of a tooth of the master member, said cam being so shaped that in one position only one lever is moved into position to be engaged by a tooth of said master member, and so that in another position all of the levers are moved into position to be engaged, respectively, by different teeth of said master member, and so that in still another position a plurality of said levers less than the whole are moved into position to be engaged, respectively, by different teeth of said master member, and said cam being so shaped as to control the point in the rotation of the master member at which a tooth of said master member will engage each different lever.

6. A shutter for photographic cameras comprising a casing, a plurality of shutter leaves movably mounted in said casing, a rotatable master member for opening and closing the shutter leaves, said master member having angularly spaced teeth formed thereon, and shutter speed timing mechanism comprising a cam rotatably adjustable in said casing about the axis of said master member, a plurality of levers pivotally mounted in said casing in angularly spaced relation about the axis of said master member, and operatively connectable to said cam to be adjusted about their pivots on adjustment of said cam so as to be moved into and out of position for engagement by the teeth of said master member as said master member rotates, and a separate retarding train operatively connected to each lever to be actuated upon rocking movement of the lever under actuation of a tooth of the master member, and means carried by said cam movable on adjustment of said cam in one direction into a position to arrest the swing of one of said levers thereby to prevent closing of said shutter until said cam is reversed.

7. A shutter for photographic cameras comprising a casing, a plurality of shutter leaves movably mounted in said casing, a rotatable master member operatively connected to said shutter leaves to open and close said shutter leaves on rotation of said master member, said master member having equi-angularly spaced teeth formed thereon, and shutter speed timing mechanism comprising a cam ring rotatably adjustable in said casing about the axis of said master member, a plurality of levers pivotally mounted in said casing in angularly spaced relation about the axis of said member for pivotal movement about separate axes, respectively, each parallel to but offset from the axis of said master member, said cam ring having a plurality of groups of cam surfaces spaced from one another angularly about the axis of said master member, each group being disposed for cooperation with a separate one of said levers, each group consisting of a plurality of cam surfaces at different radial distances, respectively, from the axis of said master member for cooperating with the associated lever to determine the position of said lever about its pivot, thereby to determine whether or not the lever associated therewith is in position for engagement by a tooth of said master member as said master member rotates, and thereby to determine at what point in the rotation of said master member the tooth engages the associated lever, the cam surfaces of the different groups being so disposed radially of the axis of said master member that one or more levers may be adjusted selectively, by rotary adjustment of said cam ring, into position to be engaged by different teeth of said master member as said master member rotates, and a separate retarding train operatively connected to each lever to be actuated upon rocking movement of the lever under actuation of a tooth of the master member as the master member rotates.

8. A shutter for photographic cameras comprising a casing, a plurality of shutter leaves movably mounted in said casing, a rotatable master member operatively connected to said shutter leaves to open and close said shutter leaves on rotation of said master member, said master member having equi-angularly spaced teeth formed thereon, and shutter speed timing mechanism comprising a plurality of levers pivotally mounted in said casing in angularly spaced relation about the axis of said master member for pivotal movement about separate axes parallel to but offset from the axis of said master member, means for adjusting each lever separately from the other levers selectively to one of several different positions about its axis to determine whether or not said lever is engaged by a tooth of said master member as said master member rotates and to determine the distance of rotation of said tooth before it engages the respective lever, said adjusting means being operable to adjust one or more of said levers selectively into position to be engaged by different teeth of said master member as said master member rotates, and a separate retarding train operatively connected to each lever to be actuated upon rocking movement of the lever under actuation of a tooth of the master member as the master member rotates.

References Cited in the file of this patent

UNITED STATES PATENTS

| | | |
|---|---|---|
| 1,234,061 | Marks | July 17, 1917 |
| 1,941,292 | Deckel et al. | Dec. 26, 1933 |
| 2,129,561 | Brueck | Sept. 6, 1938 |
| 2,326,077 | Steiner | Aug. 3, 1943 |
| 2,596,671 | Fuerst | May 13, 1952 |
| 2,655,085 | Gebele | Oct. 13, 1953 |
| 2,701,992 | Gorey | Feb. 15, 1955 |
| 2,718,835 | Fuerst | Sept. 27, 1955 |